Feb. 19, 1963     L. C. FERGUSON ETAL     3,078,076
METHOD AND MEANS FOR SEGREGATING AND RECOMBINING
FEED FOR GRINDING MILL
Filed Jan. 19, 1960                            4 Sheets-Sheet 1
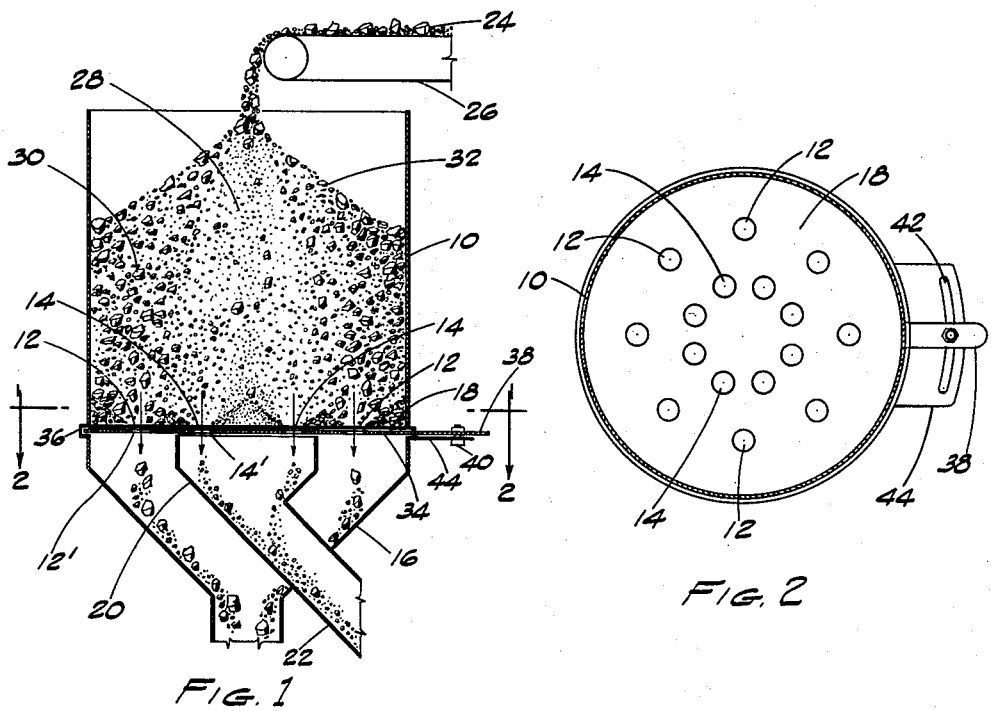
FIG. 1
FIG. 2
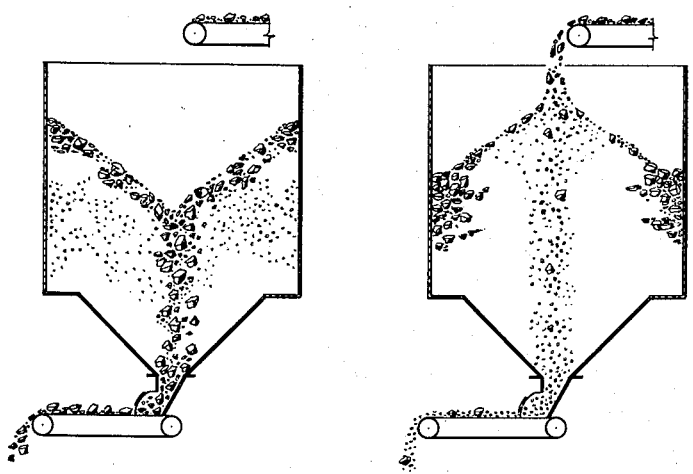
FIG. 3      FIG. 4
INVENTORS
ABE W. MATHEWS
LEROY C. FERGUSON
HARLOWE HARDINGE
BY
ATTORNEY

INVENTORS
ABE W. MATHEWS
LEROY C. FERGUSON
HARLOWE HARDINGE
BY
ATTORNEY

Feb. 19, 1963 L. C. FERGUSON ETAL 3,078,076
METHOD AND MEANS FOR SEGREGATING AND RECOMBINING
FEED FOR GRINDING MILL
Filed Jan. 19, 1960 4 Sheets-Sheet 3

INVENTORS
ABE W. MATHEWS
LEROY C. FERGUSON
HARLOWE HARDINGE
BY
ATTORNEY

Feb. 19, 1963 L. C. FERGUSON ETAL 3,078,076
METHOD AND MEANS FOR SEGREGATING AND RECOMBINING
FEED FOR GRINDING MILL
Filed Jan. 19, 1960 4 Sheets-Sheet 4
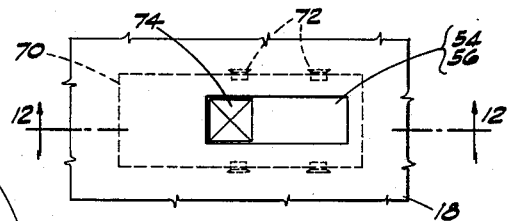
FIG. 11
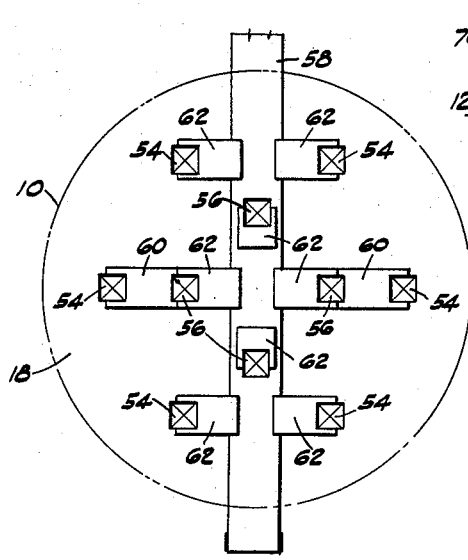
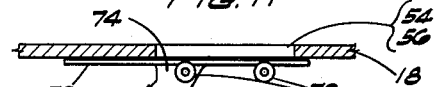
FIG. 12
FIG. 10
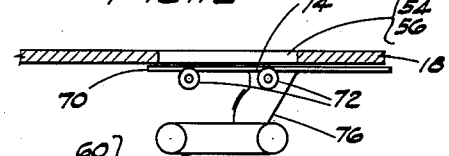
FIG. 13
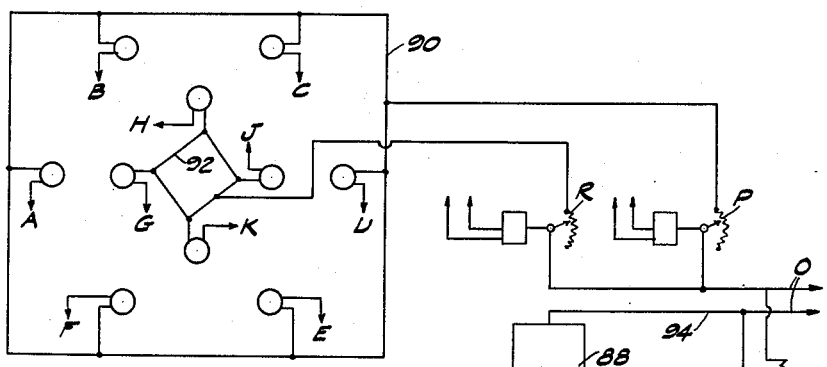
FIG. 14
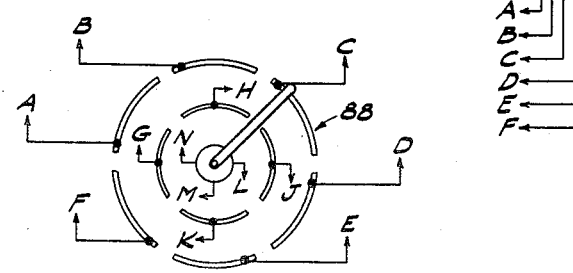
FIG. 15
INVENTORS
ABE W. MATHEWS
LEROY C. FERGUSON
HARLOWE HARDINGE
BY
ATTORNEY 3,078,076
METHOD AND MEANS FOR SEGREGATING AND
RECOMBINING FEED FOR GRINDING MILL
Leroy C. Ferguson and Abe W. Mathews, both of Hibbing, Minn., and Harlowe Hardinge, York, Pa., assignors to Hardinge Company, Inc., York, Pa., a corporation of New York
Filed Jan. 19, 1960, Ser. No. 3,313
13 Claims. (Cl. 259—180)

This invention relates to a method and means for effecting the segregation and recombining of fragmentary feed material for mills and, more particularly, for grinding mills of the tumbling type, wherein according to mill or product requirements, either balls, pebbles, rods, or the material itself is used as the grinding media. The term "fragmentary feed material" is meant to describe material capable of being broken or parted into fragments, segments or pieces of various size ranges. Also, while especially suited to provide material of desired overall composition to be fed to mills, the present invention produces a mixed product of desired overall composition for use wherever such type of material is desired.

It is well known in the art of grinding that, especially when mills of the tumbling type are employed and, selectively, either balls, pebbles, rods, the material itself, or various combinations of these are used as the grinding media, the size of the media or primary grinding elements comprises a very substantial factor in the grinding action and, in many instances, constitutes the principal factor to be considered in such action. This is especially to be considered in regard to autogenous grinding wherein the material undergoing reduction is used entirely or in part as its own grinding media.

The relationship of the size and amount of grinding media of the type referred to above to the ranges of size and quantities of material being treated within the mill is highly important in order to achieve maximum efficiency in reducing the material being treated to a desired range of fine sizes for example.

Especially in regard to autogenous grinding, wherein all of the material that is to be ground is received and comminuted as it comes from the mine or an intermediate coarse crushing device, for example, or wherein the material undergoing treatment such as reduction is composed of a mixture of sizes as it comes from a preceding source of supply, it is particularly important that the coarser particles of the material, which are utilized as grinding media, be maintained in substantially constant relationship under preferred conditions relative to the ranges of size and quantity of material of intermediate and fine sizes which is undergoing treatment by the coarser ranges of material which, in many circumstances, are referred to as pebbles.

Heretofore, various methods of autogenous or semi-autogenous grinding methods and mills have been employed to reduce the size of the raw material. One important but simple arrangement for example is to feed the material as it comes from the mine or coarse crusher and including the whole heterogeneous mass or mixture of coarse, medium, and relatively fine sizes to a tumbling mill for reduction of the whole therein, by utilizing the material as its own grinding media.

In mills employed to effect the grinding procedures referred to hereinabove, various means have been utilized to effect separation of excess quantities of the coarse grinding media, when necessary, from the intermediate and finer sizes to effect or at least attempt to approach optimum grinding efficiency. One example of a single device in which the entire feed supply of material may be reduced to a desired range of finer sizes but in which the material is not subjected to intermediate processes or steps is illustrated in a prior patent of the applicant, Harlowe Hardinge, No. 2,381,351, dated August 7, 1945. Further, articles on this general subject of which said applicant is author appeared in Engineering and Mining Journal, June 1955, Volume 156, No. 6 and in the Mining Congress Journal, October 1958. The present invention comprises substantial improvements over these prior procedures and devices and preferably has particular reference to the processing of so-called run-of-mine solid material which comprises a mixture of coarse, medium and fine material, said material preferably being reduced to a desired range of fine sizes for example substantially in one operation. Accordingly, it is the principal object of the present invention to provide a method and means to accomplish the same in which the raw feed material for a grinding mill is prepared in such a manner that desired proportions of coarse, medium and/or fine materials are provided first by segregating and then recombining such classes of material in their average proportions, preferably automatically, to effect maximum efficiency in grinding operations especially in mills of the tumbling type and particularly autogenous mills and processes employed therein.

Another object of the invention is to employ in such material preparation processes and mechanisms the principle of dropping the raw material onto a pile thereof, whereby the material forms a natural cone and the coarse material tends to flow or run down the cone to the bottom thereof adjacent the periphery of the pile, whereas the finer material remains substantially at the top and/or central portion of the pile, particularly as the pile rises. In this regard, not all of the coarse material will roll to the bottom, peripheral portion of the pile and not all of the fines will stay at the top or central portion of the pile but there nevertheless is a definite segregating tendency of the type described in such operation.

A further object of the invention is to feed the materials which are so segregated in a controlled manner to a grinding mill so as to produce a mixture that represents an average of the desired size ratios of the material as supplied over an extended period of time to the grinding mill system.

Still another object of the invention is to provide methods and grinding mill systems in which a minimum of physical structure and apparatus is required to effect the desired results and in which any enclosure required for the material being accumulated may be of comparatively low cost or even formed from the material itself in a natural pile thereof.

One further object of the invention is to provide a feed arrangement from the piled and segregated material wherein a plurality of feeders are employed for a given size range and are operated in a suitable manner to maintain adequate feed rates while avoiding appreciable cavitation at undesired areas in the pile of material being fed, thereby maintaining means within the pile for continuous segregation of the material as fed to the pile.

Still another object of the invention is to prepare and control the feed to a preferably autogenous grinding system by methods and apparatus to accomplish the same which consists of segregating ranges of sizes of feed material for the mill system, including the storage of the various ranges of sizes so segregated, in sufficient amounts that feeding the different size ranges in controlled amounts may take place over a sufficient time cycle as to permit a smoothing-out of the major variations in size ranges which existed as received from the original source such as a mine or coarse crushing apparatus.

Details of the foregoing objects and of the invention, as well as other objects thereof, are set forth in the following specification and illustrated in the accompanying drawings comprises a part thereof.

In the drawings:

FIG. 1 is a vertical sectional elevation of one embodiment of storage device in which raw material is being fed for arrangement in a natural pile and from the bottom of which storage device ranges of different sizes of material may be withdrawn, as desired.

FIG. 2 is a horizontal sectional view of the device shown in FIG. 1, taken on the line 2—2 of said figure.

FIG. 3 is an exemplary illustration of a simple storage device in which material is being withdrawn at a rate faster than it is being fed to the container.

FIG. 4 is a view similar to FIG. 3 but in which the material is illustrated as being withdrawn from the container at a rate less than that at which it is being fed to the container.

FIG. 10 is a horizontal sectional view taken on the line 10—10 of FIG. 6.

FIG. 11 is a fragmentary plan view as seen from inside a storage device of the type shown in the preceding figures and representing an exemplary adjustable mounting for discharge means from the storage device.

FIG. 12 is a fragmentary vertical sectional elevation taken on the line 12—12 of FIG. 11.

FIG. 13 is a view similar to FIG. 12 but showing the discharge member in a different position relative to an opening in the bottom of the storage device from that shown in FIG. 12.

FIG. 14 is an exemplary wiring diagram operable to control discharge means of the type illustrated in FIG. 10.

FIG. 15 is an exemplary plan view of a commutator type electric switch energizing means operable with the wiring diagram shown in FIG. 14 or otherwise.

Figure 5:
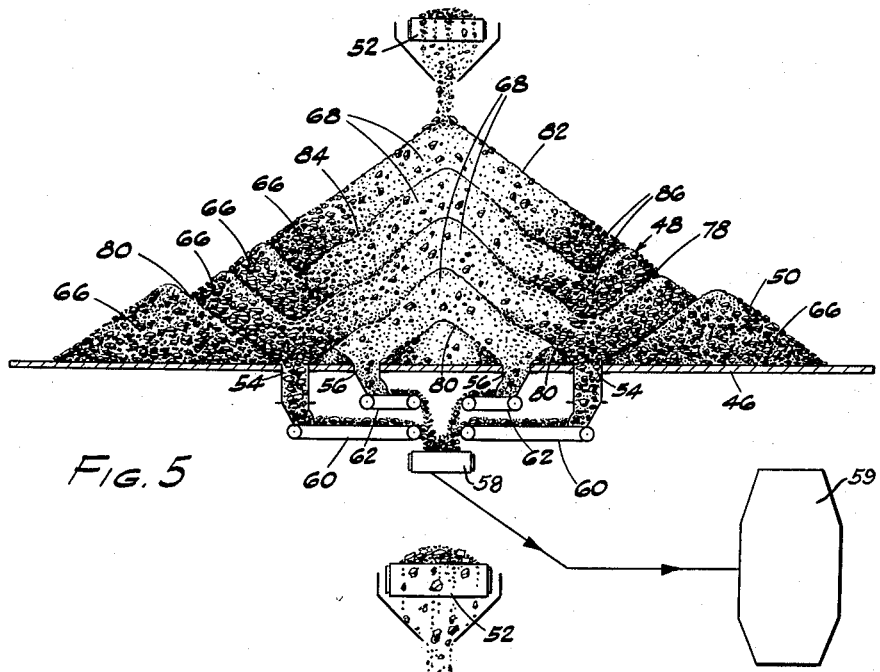
FIG. 5 is a vertical sectional elevation illustrating an example of natural conical piling of raw material and from which pile successive withdrawals of both relatively coarse and fine ranges of material have taken place a number of times.

The tendency of fragmentary materials to segregate when fed to a pile and particularly the tendency of the coarse particles to roll down the pile to the outer periphery thereof, unless controlled, operates to the disadvantage of certain types of grinding mills and particularly those employing autogenous grinding principles. Hence, if a mixture of various sizes of material is deposited progressively in a pile, in a bin or otherwise, and is not removed uniformly from the bottom thereof, for example, at different exits respectively below the various sizes of material, there will be an excess of fines removed at one time and an excess of coarse particles removed at another. Typical examples of these conditions are shown in FIGS. 4 and 3 respectively. This operates to the distinct disadvantage of an autogenous grinding mill wherein all of the material is ground in one unit inasmuch as, at times, there may be a deficiency of coarse grinding material to grind the fines adequately, yet at other times, there may be too much coarse material present so that it either breaks itself up too rapidly or there will be insufficient fines present to maintain a steady capacity rate.

By providing means to control the proportions of both the coarse and fine range sizes of material in accordance with the present invention, so that said ranges will be fed from storage at rates which correspond to the overall desired average size range, optimum efficient grinding results will be produced and the capacity of the mill can be maintained reasonably constant relative to the grinding effect of the various sizes of material in an autogenous mill, whereby the overall efficiency and operating characteristics are substantially improved over previous methods and operating conditions employed in known mills and methods in the art.

As distinguished for example from the method and apparatus described in said aforementioned prior Patent No. 2,281,351, wherein segregation of the materials was effected by the use of screen type sizing devices of various form, the present invention comprises processes and various embodiments of mechanisms capable of effecting such processes which methods and devices utilize the tendency of solid materials to flow or roll in certain self-segregating manners when discharged onto a pile, such self-segregation taking place especially between the relatively fine and relatively coarse particles, the fines accumulating substantially centrally within the pile, while the coarse particles accumulate from the periphery of the pile inward toward the center but principally are disposed so as to surround the accumulated fine materials in the central portion of the pile. While such a method is not as accurate as a screening arrangement to separate various ranges of fine and coarse materials from each other, actual physical tests have shown that it is possible to take advantage of the aforementioned segregating tendency of solid materials when discharged into a pile and utilize the same to advantage and thereby materially reduce expense by eliminating expensive feed bins, screening mechanism, conveyors, and incidental equipment.

Referring to FIGS. 1 and 2, a relatively simple receiving and storage device is illustrated comprising an exemplary cylindrical container or bin 10 having a circular outer row of discharge openings 12 in the bottom thereof and a second circular row, having a smaller diameter than the first, of discharge openings 14 also provided in the bottom of the bin 10. A conical discharge chute 16 depends below the bottom 18 of the bin 10 which contains the openings 12 and 14 and surrounds an inner conical discharge chute 20. Chute 20 has a conduit 22 leading from the bottom thereof and extending through one wall of the chute 16 as clearly shown in FIG. 1. It is intended that this simple illustration of FIGS. 1 and 2 be exemplary for purposes of illustrating in a simple manner the effectiveness of the process and one embodiment of apparatus to effect the process comprising the present invention.

When the raw material 24 is fed by any suitable feed means such as a conveyor belt 26 to the bin 10 and preferably to the center of said bin, particularly if the feed is at a rate greater than the rate of withdrawal through the discharge openings 12 and 14, the material will tend to accumulate in a pile having a conical top as shown in exemplary manner in FIG. 1. By analyzing the cross-sectional constitution of said pile, it will be seen that there is an inner core 28 substantially of relatively fine material and an outer annular zone or band 30 substantially of relatively coarse material surrounding the inner core 28. The outer band of coarse material results from the tendency of the coarser pieces of the raw material 24, in flowing or rolling down the conical upper surface 32 of the pile of material within the bin 10, coming to rest adjacent the periphery of the bottom of the slope or somewhat upwards therefrom, depending largely upon the size of the material, the rate of fall of the feed, and the angle of repose of the cone as illustrated in exemplary manner in FIG. 1 by the surface 32.

When the material is withdrawn from the interior of bin 10, the coarser ranges of material will flow through the discharge opening means 12, while the finer ranges of material will flow through the innermost discharge opening means 14. A simple, somewhat schematic means for controlling the sizes of said discharge opening means as well as stopping such flow therethrough comprises plate 34 which is below and closely adjacent the bottom 18 of the bin 10, said plate being provided respectively with an outer row of discharge holes 12' and an inner row of discharge holes 14'. Said discharge holes preferably are arranged similar to and coinciding with the holes 12 and 14 in bottom 18 of the bin. Any suitable supporting means for the exemplary plate 34 may be provided such as an annular recess 36 within the walls of the bin 10. Further, the plate 34 has a radial arm 38 projecting therefrom and suitable locking means 40 connected to said arm extend through a slot 42 in plate 44 which is fixed relative to the bin 10. While somewhat schematic, apparatus such as described hereinabove nevertheless is a type which can be employed when feeding from relatively small bins or for laboratory purposes, for example. For larger installations, appropriate structural arrangements are employed, some of which are described in other embodiments of the invention illustrated in subsequent figures and described in detail hereinafter.

Segregating and recombining mechanism of the exemplary type illustrated in FIGS. 1 and 2 is capable of smoothing out the variations in proportions of relatively fine and coarse material which occur naturally in raw material from a source such as that produced at a mine and which is placed, for example, upon a conveyor operating at a relatively constant rate or is carried by trucks which dump intermittently at various intervals of time to effect delivery of said material either to a mill, coarse crusher, or a preliminary surge hopper or bin, for example. Over an extended period of time, the average relatively fine and coarse composition of such material will be substantially constant but during any short fraction of that extended period of time, the fine and coarse proportions of the raw material usually will not be average.

The segregating of the relatively coarse and fine material into zones in a storage mass as a result of feeding raw material onto a storage mass, as illustrated in FIGS. 1 and 2, coupled with the regulation either of the location of the discharge openings relative to the zones of segregated materials, or the rates of discharge respectively from the zones of said mass, which rates may be regulated independently regarding the rate of discharge from the different zones, or combinations of any of these, results in the evening or smoothing out of the normally somewhat momentary irregular proportions of relatively fine and coarse proportions in the raw material at its source.

Such smoothing out of the relative proportions of fine and coarse material in the products delivered from the storage mass in accordance with the invention will result in such product having a substantially constant average size range approximately the same as the average in the material delivered to the storage means over a substantial period of time. It is to be understood however that the terms "substantial period of time" or "extended period of time," or the equivalent thereof, as used in the description and in the appended claims means sufficient time to permit delivery from its source to said storage means of a substantially average composition of various ranges of sizes of material normally expected to be present in such source material. In view of this, such period of time may vary in extent from a few minutes at one extreme to possibly a number of days at the maximum extreme. This variation is caused by many factors including hardness of material encountered and differential as to breaking and disintegrating characteristics of the material itself, extent of pretreatment such as coarse crushing, methods of mining, type of delivery from the source, and other conditions causing variations in the average composition.

For purposes of illustrating the effectiveness of segregation which can be achieved by mechanism of the type illustrated in FIGS. 1 and 2, the following table of results obtained by the use of similar apparatus illustrates reasonably constant proportion of relatively coarse and fine products.

TABLE I

*Material Sizing by Utilizing the Effect of Its Angle of Repose*

| Test No. | Bin Load Conditions | Discharge Wts. (Lbs.) in 10 Sec. | | Feed Rate, Tons Per Hour | Feed (Mesh) | | | Screen Analyses | | | | | |
|---|---|---|---|---|---|---|---|---|---|---|---|---|---|
| | | Inner Comp. | Outer Comp. | | | | | Outer Ring (Mesh) | | | Inner Ring (Mesh) | | |
| | | | | | +4 | +14 | −100 | +4 | +14 | −100 | +4 | +14 | −100 |
| 1A | Bin 75% full at start of test. Feeder not running. | 43.0 | 30.5 | 0 | 26.2 | 88.6 | 5.6 | 41.6 | 12.7 | 1.25 | 24.6 | 23.8 | 6.3 |
| 2 | 40% full at start of test. Feeder not running. | 50.5 | 34.0 | 0 | 26.2 | 88.6 | 5.6 | 35.0 | 18.5 | 2.2 | 16.6 | 30.6 | 8.5 |
| 1B | 25% full at start of test. Feeder not running. | 49.0 | 33.0 | 0 | 26.2 | 88.6 | 5.6 | 35.2 | 17.7 | 1.8 | 16.8 | 30.2 | 8.5 |
| 3A | 12½% full at start of test. 20% full at end. Feeder running. | 48.25 | 38.0 | 20 | 26.2 | 88.6 | 5.6 | 35.2 | 18.2 | 2.7 | 23.2 | 24.4 | 7.4 |
| 3B | 73% full at start of test. 90% full at end. Feeder running. | 52.25 | 36.0 | 20 | 26.2 | 88.6 | 5.6 | 32.4 | 19.8 | 2.4 | 15.4 | 30.6 | 10.5 |

In conducting the tests resulting in the data included in Table I above, a relatively fine feed was used as it was possible to accomplish two purposes, namely, make an accurate test, and also conduct a test in a range where segregating tendencies are not as great as in the coarser ranges, which latter ranges are generally used in autogenous grinding systems. It is known that the segregating tendency of materials increases as the size of the material increases. Accordingly, by conducting the tests with relatively fine feed material, the least favorable type of results were obtained, as compared with using either coarser material or mixtures of raw materials containing various percentages of relatively coarse material together with fine material.

In feeding fragmentary material to a grinding mill and particularly one used in the field, it is customary either to feed run-of-mine material to the mill intermittently such as by dumping material from large trucks running between the loading station and the mill entrance, or if the coarser material in such run-of-mine material is too large for practical purposes, such run-of-mine fragmentary material first is fed to a primary crusher to reduce particularly the largest pieces of material in the mixture. In any event, the feed rate to the grinding system, especially at the commencement of such feed, is intermittent. Such type of feeding causes unsatisfactory material segregation. In an effort to simulate such conditions, the tests from which the results of Table I were obtained were conducted under various bin loading conditions and feeding and discharging conditions, such as discharging without the feeder operating as well as with the feeder operating.

It has been found from practice that if a bin with a central outlet and a central feed point is fed intermittently, it will deliver different size ranges, depending upon the operating cycle. When the feeder to the pile is running and the pile formed in the bin is such as to form a cone with the apex uppermost, much of the coarse material will tend to go to the periphery of the accumulation, while most of the fines will remain near the center as well as at the top of the cone. As the bin is discharged and particularly when it is discharged at a rate less than the feed rate, the size from the center feeders will be somewhat finer than the average as the bin is gradually filling up. Then, as the top feeder stops and the bottom feeder continues, accumulation within the bin will cone downwardly, whereby the bin then commences to discharge the load nearer its periphery which is predominately coarse material, whereby the product discharged will be coarser than previously. Such exemplary conditions respectively are illustrated in FIGS. 4 and 3 of the drawings.

In contrast to the undesired conditions respectively illustrated in FIGS. 3 and 4, by employing the methods of the present invention which contemplate the use of a series of outlets respectively located in different positions spaced laterally from each other in the bottom 18 of the bin 10 in FIGS. 1 and 2, including both the inner row of openings 14 and the outer row of openings 12, and also by discharging material respectively from said inner and outer row of differently positioned openings substantially simultaneously, the so-called difference in coning effect is eliminated. The size range of relatively fine material discharged from the openings near the center of the bottom of the bin will be reasonably constant, as with that of the relatively coarse material discharged from the openings nearer the periphery of the bin. This action is quite different from that when a single central opening for example, is employed. Then, upon recombining the products discharged respectively from the inner and outer rows of openings roughly in proportion to the overall amounts as fed over a substantial period of time to the pile, having due regard of course to variations taking place from time to time in the feed of the material to the bin, a product mixture can be obtained which essentially will be constant in its size range composition, whereby a relatively uniformly sized mill feed is produced which will aid in obtaining optimum results in a grinding system when the mill is fed therewith.

Referring to the test data included in Table I, it will be seen that under the various operating conditions, segregation or sizing of the feed was maintained as long as the operations were conducted essentially in accordance with the provisions stated above. The segregating tendency also was of sufficient moment to insure control of the size ranges under all operating conditions which would be encountered in normal practice. Said results also demonstrate that size segregation of material is pronounced even with this relatively fine material, thereby indicating that properly controlling the segregation is important especially where large sizes in particular bear an important relation to the overall efficiency of the operation as, for example, where said large sizes of the order of 5" to 10", for example, may be utilized as grinding media for a ground and semi-ground material of smaller size with which said large coarser sizes are intermixed when the various sizes of material from the bin are recombined.

In FIG. 5, a relatively inexpensive storage arrangement is illustrated, wherein no bin is provided but, rather, a suitable surface such as a slab or floor 46 is shown upon which material 48 is piled. At the periphery of the pile of material 48 there is, for example, a circular pile 50, which is triangular in cross section and may be termed a toroidal cone, constitutes confining means for the material which is within the circular pile 50. Under practical situations, the circular pile 50 largely will comprise coarse material with fines in between the coarse pieces and results from the feed of a mixture of material to the top of a pile by feed means such as feed conveyor 52.

The floor 46 is provided with suitably separated outlet openings respectively for the discharge of predominantly relatively coarse and relatively fine materials, the same comprising exemplary circular arrangements of spaced outer openings 54 and inner openings 56. The circular arrangements of such holes is best illustrated in plan view in FIG. 10. A central discharge or collecting conveyor 58 extends beneath the floor 46 and disposed beneath each of the outer and inner openings 54 and 56 in the floor and extending to the discharge conveyor 58 are various auxiliary conveying means such as endless belts 60 and 62 which are best shown in plan view in FIG. 10. Said endless belts 60 and 52 constitute means to feed the various sizes of material discharge through the openings 54 and 56 to the central discharge conveyor 58 so as to be conducted thereby either to an autogenous grinding mill 59, as shown in FIG. 5, other storage means, or other types of mills.

Figure 6:
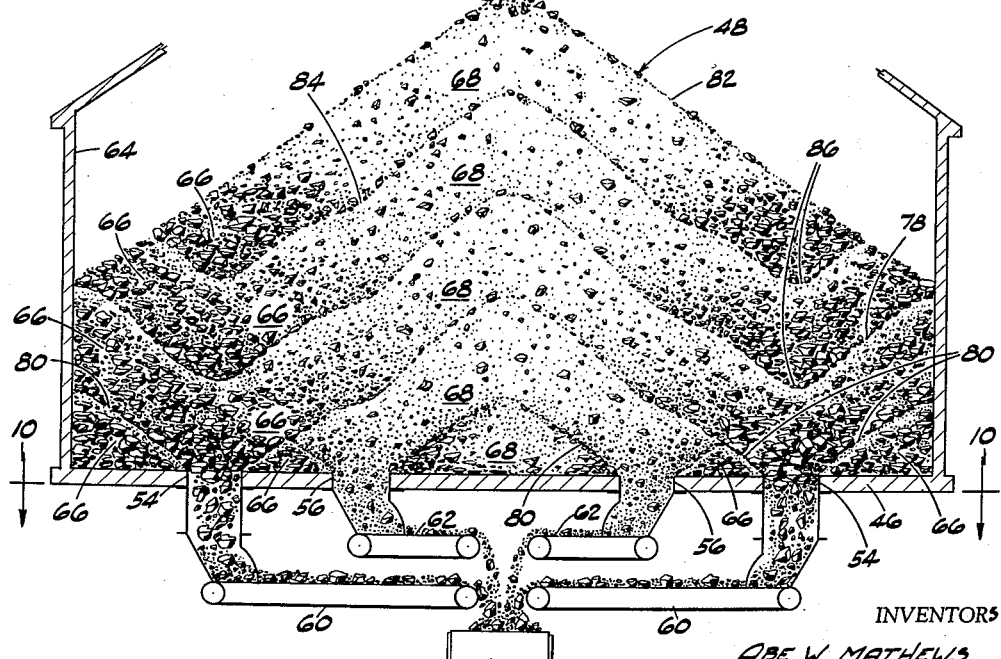
FIG. 6 is a view similar to FIG. 5 but showing an embodiment of piling and segregating of raw material effected within a storage device such as a bin which is circular in cross-section.

The arrangement shown in FIG. 6 is similar to that illustrated in FIG. 5 except that in FIG. 6 a preferably cylindrical wall 64 is employed to form a bin which confines the material more abruptly than the means in FIG. 5 relative to the floor 46. However, in both FIGS. 5 and 6, predominantly relatively coarse material 66 will tend to accumulate near the periphery of the piled mass while predominantly finer material will accumulate near the center of the piled mass as illustrated in exemplary manner in FIGS. 5 and 6. In employing the principles of the invention, assume for example, run-of-mine material is fed to the pile of material 48 by feed conveyor 52. Once even a small cone of said material starts to form, the coarser particles will run down the same toward the outer periphery of the pile, while the finer segments of material 68 will tend to accumulate adjacent the center of the pile. The finer material 68 is above and will be discharged through inner openings 56 in floor 46, while the coarser particles are above and will be discharged through the outer openings 54 within the floor 46.

While it is a fact that employment of the coning-segregating type of classification of material as contemplated by the present invention will not result in the coarser material being solely coarse material and the relatively fine material being solely fine material, nevertheless, the segregation is substantial and sufficient so that, when the materials of different sizes are recombined, a product is obtained over a period of time which will be substantially constant as to proportions of relatively fine and relatively coarse components, notwithstanding substantial variations is such proportions in the material fed to piled mass. Further, while the illustrations shown in the drawings and described hereinabove have been based upon more or less circular outlines of piles and feed material to the upper portion thereof substantially centrally of the pile and particularly centrally of enclosures in which the piles are formed, it is to be understood that the present invention may be applied effectively to piling and segregating arrangements in which the feed may be substantially off-center and even adjacent one extreme side of the pile. Nevertheless, where only a single sloping side of a pile is provided, the coarser elements of the material fed to the pile will roll down said single sloping side and become accumulated adjacent the opposite side of the pile from that in which the finer sizes of material become accumulated.

The essential requirement necessary to provide under the foregoing circumstances in accordance with the principles of the invention is that the discharge openings for removing various desired sizes of material from the bottom of the pile be located respectively beneath the predominant accumulations of the sizes of material which are desired to be discharged respectively through the different and spaced discharge openings at the bottom of the piled mass.

Figure 8:
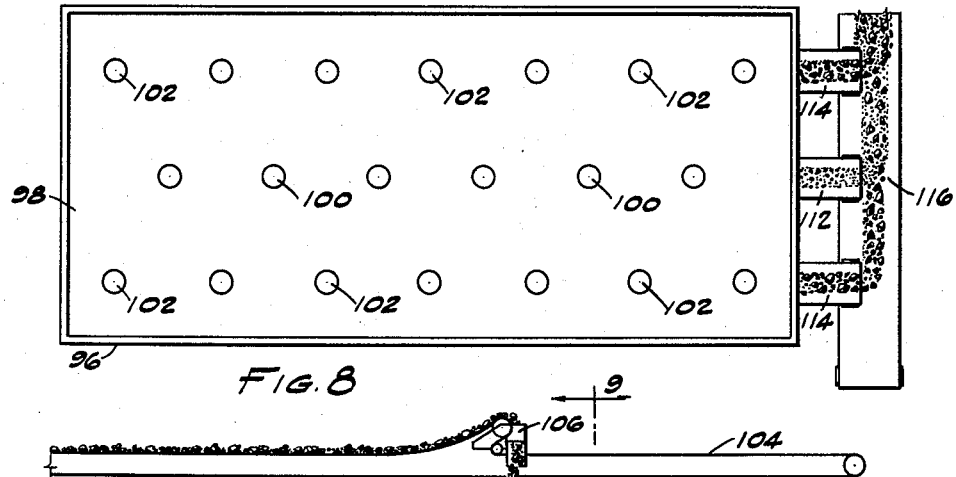
FIG. 8 is an exemplary horizontal sectional view taken on the line 8—8 of FIG. 7.
Figure 7:
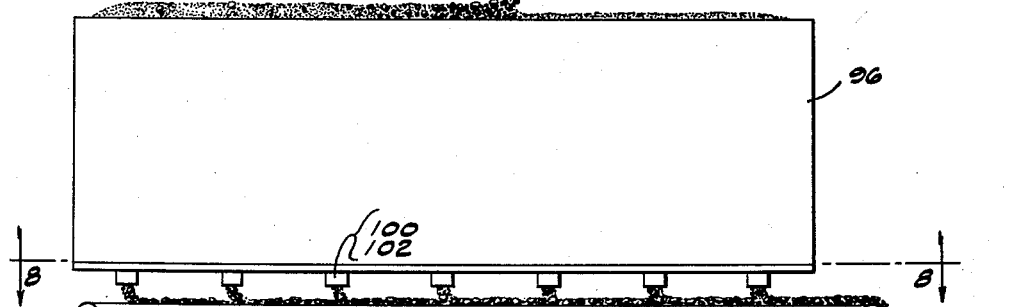
FIG. 7 is another embodiment of storage device of an elongated nature and into which the raw material is fed in a longitudinally traversing manner.
Figure 9:
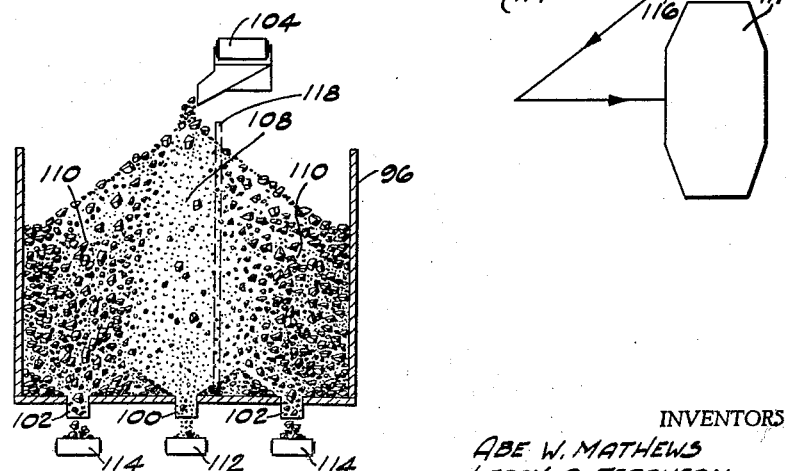
FIG. 9 is an exemplary vertical sectional view taken on the line 9—9 of FIG. 7.

FIGS. 5, 6 and 10 illustrate various circular arrangements of discharge openings, while FIGS. 7 through 9 show long straight rows of discharge openings, which openings are illustrated for purposes of simplification of the drawings as being substantially fixed or stationary relative to the bins or floors shown in the various figures. However, it is contemplated that adjustability in position of at least the most effective discharge areas of said openings relative to the material zones thereabove may be achieved by employing suitable adjustably positionable discharge means of which one exemplary type is illustrated in FIGS. 11 through 13. In this type, a cover plate 70, which may be rectangular in outline, for example, is disposed beneath each of the openings 54 and 56 and is supported by any suitable means such as a plurality of pairs of rollers 72. Said plates each have a discharge opening 74 therein which communicates with a depending chute 76 extending to the endless belts 60 and 62. Such arrangement will afford reasonable latitude in positioning of the discharge openings 74 of said adjustable discharge means as desired relative to the bottom 18 of the bin 10.

In progressively removing material from arrangements thereof such as shown in FIGS. 5 and 6, for example, it is contemplated that discharge preferably will take place simultaneously from both the inner and outer row of discharge openings 54 and 56. As the discharge occurs, particularly when material is not being fed to the pile by conveyor 52, the discharge will cause a lowering of the bin level, whereby the pile therein may assume the exemplary position indicated by the line 78. If the discharge conveyors 60 and 62 are operated until the bin delivers no further feed and, essentially is empty, and the feed conveyor 52 is not operated in the meantime, the material in the bin will assume the final line 80 which is the angle of repose of material remaining in the bin. Should the feed conveyor 52 then be operated for a sufficient period of time, the pile will be restored to the exemplary repose line 82.

Normally, it is possible to make a reasonable estimate of the proper locations of the outer row of discharge openings 54 and inner row of discharge openings 56 relative to the bin and each other so as to maintain a reasonably uniform discharge rate in order that there will be little or no cavitation such as slightly indicated at 84 in FIGS. 5 and 6. However, there will be cavitation as indicated at 86 whenever the discharge rate exceeds the feed rate. Under such circumstances however, the coarse material will be drawn from the periphery into the outer row of discharge openings 54 for the coarse feed section of the pile or bin.

Where a number of feeders are employed in a single bin or a single mill operation, the feed rate from any one feeder may be quite low when all feeders are running simultaneously, for example, particularly if a vibrating type of feeder is used, whereby the feed from that particular feeder will be quite inaccurate. Further, if a conveyor type of feeder is used, the speed reduction ratio may be such as to increase the cost of the component parts of the feeder. It also is desirable at times that the feed rate from a given point be reasonably high which will, in some instances, tend to avoid bridging in a bin of material. Combining all these factors makes it desirable, in certain instances at least, to have the feeders operate intermittently and, for the sake of illustration, have one feeder at a time, but successively and over a relatively short period, effect all of the feeding for its rows of feeders. The same would also be the case for feeders in the other row or rows, thus avoiding the tendency for undue cavitation. Exemplary wiring diagrams to accomplish this objective are shown in FIGS. 14 and 15.

Referring to FIGS. 14 and 15 in detail, the wiring diagram is such that the feed motors for the belts beneath the outer row of discharge openings 54 are wired together in conjunction with a rotating switch 88 of the commutator type illustrated in examplary manner in FIG. 15. The common wiring 90 connects the outer row of motors as shown clearly in FIG. 14. Power is introduced to the circuit by conductors O, one of which conductors passes through a feeder rate control element P which is specifically illustrated as a resistor. In turn, this resistor is controlled by manual adjustment or adjustment regulated by an operating condition within the mill, such as sound, power consumed to operate the mill, or other means, which specific method and means are not the subject of the present invention. Power from the feeder rate control element P then passes through the connecting conductor 90 for the outer row of feed motors and then back through the commutator sequence switch 88 of FIG. 15. For simplicity, the motors for the outer row of feed devices are indicated A through F. As indicated in FIG. 15, motor C will be operating in accordance with the momentary position of the switch as shown in said figure.

Concerning the motors for the feed belts of the inner row of discharge openings 56, power passes from the source conductors O to control elements R and from there to common connecting wiring 92 for said inner row of motors. The same movable commutator arm of the sequence switch 88 which actuates the outer row of motors likewise may be utilized to actuate in sequence the inner row of motors which respectively are indicated G, H, J and K in both FIGS. 14 and 15. If desired, a variable speed motor may be connected to the movable armature of the sequence commutator switch 88 so as to drive the same at a selected, desired rate of speed to effect sequential operation of both the inner and outer rows of motors for the feeders of material from the bottom of the bins or piles of material.

The sequence switch may require any desired period of time to make a complete revolution. For the sake of illustration, assume that it requires six minutes to make a complete revolution. This will make it possible for each of the feeders A through F to run approximately one minute. At the same time, one of the inner row of motors likewise will be running for at least part of that period. Inasmuch as the inner row of feeders in the specific illustration has four and the outer row has six, the time cycle of the inner and outer row will not be the same. However, since it is contemplated that no one feeder operates sufficiently long to have an appreciable effect upon the slope of material in the bin to cause objectionable amount of cavitation, it is possible to operate the feeders intermittently and thus gain the advantage of having them run, if desired, at a reasonably high feed rate even though in the specific illustration of the drawings the bin outlet positions and the times for operating the feeders do not correspond exactly.

Further, if desired, it may be preferable to change the feed volume rate even more than contemplated by the arrangement specifically described above. Such a change in feed volume rate can be achieved by employing a timer sequence for different feeders simply by the addition of a standard contact timer in line 94, for example, so as to be in line with the sequence switch or timer 88. Suitable contact timers are well known in the art and details are unnecessary except to state that such timers make and break a circuit a preset degree from a fraction of a second to several minutes or hours if necessary. When such contact timer is located in a circuit, all feeders in the general feed circuit can be started and stopped to effect somewhat similar results to those first described above. Such contact timers however might be found to be particularly advantageous when using vibrating types of feeders which are subject to wide variations and the feed rate is better and more constant at higher average rates than when set at a low vibration rate.

The contact timer of the type referred to can be set, for example, so that whatever feeder or feeders are functioning in the circuit at the same time, during the "on" period, for example, would be "on" for one second and "off" for a ten second period. Hence, during the feeding cycle, the feed rate would momentarily be about 10 times greater than if these feeders ran continuously. Further, it is obvious that a time contactor without the sequence feeder arrangement could be employed for picking out certain feeders to operate as desired, in which event all feeders of both the inner and outer rows could be made to feed simultaneously if desired. It is obvious from the foregoing that with proper adjustment of the feed rate controls R and P, one relative to the other, the slope on the surface of the pile 48 may be maintained substantially intact regardless of the character of feed or manner of feeding the pile.

For purposes of illustrating the applicability of the present invention to storage and segregation arrangements which are other than circular in plan view, attention is directed to another embodiment of bin arrangement illustrated in FIGS. 7 through 9. In said illustration, a rectangular bin wall 96 is provided, the floor 98 of said bin being provided with an exemplary central row of spaced outlet openings 100 and two similar exemplary outer rows of spaced outlet openings 102. It will be understood that any suitable controlled closure means are contemplated for use with the outlet openings 100 and 102, similar in design and operation for example, to those illustrated and described in relation to the preceding embodiments. The principal purpose of the simplified illustration in FIGS. 7 through 9 is to show principally a mass arrangement other than as illustrated in FIGS. 1, 2, 5 and 6, and the manner of storing and segregation of relatively coarse and fine material within such mass in bin 96.

By way of further exemplary illustration, the run-of-mine material is fed to the upper portion of the bin 96 by feed conveyor 104 which, for example, may employ a motor-propelled tripper-type feeder 106 which operates to feed material more or less evenly from end to end of the bin 96. By reference to FIG. 9, it will be seen that the predominantly relatively fine material 108 will accumulate substantially centrally of the bin 96 in a longitudinally extending manner, whereas the predominantly relatively coarse material will be segregated from the finer material and accumulate adjacent opposite sides of the bin 96 in longitudinal manner.

The relatively fine material discharged through the central row of openings 100, which incidentally may be opened and operated intermittently or continuously, as desired in accordance with principles described above, is received by conveyor 112. Similarly, the relatively coarse material from the outer rows of discharge openings 102 respectively is received by conveyors 114, it being understood that the feed from openings 102 also may be either intermittent, constant, or otherwise, as desired. The auxiliary conveyors 112 and 114 discharge at one end onto a common discharge or collecting conveyor 116 upon which the material is more or less recombined and is of an overall average size range for movement either to an autogenous grinding mill 117, as shown in FIG. 7, other types of mills, or storage means, as desired, for example. Further, while the feed to the bin 96 is substantially along the center, said feed may be along one side if desired and a segregating slope will still be provided such as can be visualized by considering the bin having a side 118 next to the top feeder 104 in FIG. 9.

By employing the general arrangement of introducing fragmentary feed material to a bin designed specifically to take advantage of segregation caused by the action of material running down a slope, separating an appreciable portion of the coarser fractions thus obtained from the relatively fine fraction, and then recombining them prior to feeding to a mill such, for example, as an autogenous grinding mill, in accordance with the present invention, there is provided a very practical and economical method of smoothing out the variations that take place in material from a mine or coarse crusher, open pit or preliminary surge bin, whereby there is provided a feed having an average mixture corresponding to the composition of the material fed to the storage means over a substantial period of time. While the various embodiments of the methods and segregating and recombining systems illustrated in the drawings and described hereinabove may be adjusted and regulated either manually or automatically and are particularly advantageous when used to furnish recombined material to autogenous grinding mills, the present invention is not intended to be restricted for use with material to be fed to autogenous grinding mills only since said invention also is applicable to other types of operations where bin segregation causes variations in the operation of other types of mills such as standard ball, rod, pebble mills or to other processes that call for an average size mixture. It is intended also to be within the scope of this invention to include the feed of recombined material to such other types of mills. While for example an autogenous mill system may call for a feed size of the original feed, of the order of six inches in one type of autogenous mill, or of the order of for example three inches in other types, particularly in the so-called regrinding type of mill, the invention also is applicable to material of much finer sizes and will function in regard to such finer materials as is evidenced from the results of the tests set forth in Table I.

While the invention has been described and illustrated in its several preferred embodiments, it should be understood that the invention is not to be limited to the precise details herein illustrated and described since the same may be carried out in other ways falling within the scope of the invention as claimed.

We claim:

1. Means operable to segregate and recombine different sizes of fragmentary material into a substantially constant average composition and comprising in combination, storage means having a bottom substantially free from partitions and arranged to receive and support a piled mass of solid fragmentary material of different sizes and which mass is piled at a rate to form a sloping surface to effect segregation of said material into adjacent zones of relatively fine and coarse materials which are in side-by-side relationship in said mass, said storage means having a plurality of separate discharge opening means in said bottom thereof spaced from each other and respectively positioned beneath said zones of segregated relatively coarse and fine materials when deposited upon said bottom, independently operable discharge rate control means provided respectively for said separate discharge opening means, said control means being independently adjustable to control and effect discharge of said relatively coarse and fine materials from said discharge opening means at rates regulatable independently relative to each other to maintain a slope extending downwardly and outwardly from the top of the piled mass thereof, and means operable to effect recombining of said discharged material to obtain a mixture thereof having substantially constant average size ranges of material therein over an extended period of time.

2. The means operable to segregate and recombine different sizes of fragmentary material set forth in claim 1 further including means adjustably supporting said separate discharge opening means relative to the bottom of said storage means, whereby the positions of said discharge opening means may be varied relative to the zones of material to be discharged through said discharge opening means.

3. Means operable to segregate and recombine different size ranges of fragmentary material into a substantially constant average composition and comprising in combination, storage means substantially free from partitions and having a bottom to receive and support a mass of said fragmentary material, means to feed said fragmentary material to said storage means at a rate to form a sloping surface to effect segregation of said material into zones comprising a plurality of size ranges which in relation to each other are relatively fine and coarse and at a location generally suitable to form a sloping pile upon said bottom, said storage means having a plurality of discharge opening means in said bottom thereof spaced from each other and respectively positioned beneath said zones of segregated relatively coarse and fine materials in said sloping pile, discharge rate control means for said discharge opening means operable to control and effect separate discharge of said relatively coarse and fine materials at selected rates, and means operable to recombine said discharged materials into a mixture thereof which has substantially constant average size ranges over an extended period of time.

4. The segregating and recombining means set forth in claim 3 further characterized by the discharge opening means for said relatively coarse material extending around and radially outward from the discharge opening means for said relatively fine material.

5. The segregating and recombining means set forth in claim 3 further characterized by said storage means being elongated to support an elongated piled mass of solid material segregated into elongated zones of relatively coarse and fine sizes thereof and having a plurality of substantially parallel rows of discharge openings in the bottom of said storage means, said rows respectively being spaced transversely and positioned beneath the elongated zones of different sizes of material.

6. The segregating and recombining means set forth in claim 3 further including a collecting conveyor belt operable beneath said storage means and a plurality of auxiliary conveyor belt means positioned beneath each of said discharge opening means and extending to said collecting conveyor belt to deliver thereto the various sizes of material from said discharge opening means, and means operable to move said auxiliary conveyor belt means at rates regulated to effect a recombining of all of said sizes of material into a mass of substantially constant proportions of said different sizes of material as said collecting conveyor belt moves to discharge.

7. The segregating and recombining means according to claim 3 further including means operable to feed said recombined material to an autogenous grinding mill for reduction therein of all size ranges of said material at optimum rates.

8. A process of providing a mixture of fragmentary material having a substantially constant average proportion of various size ranges, said process comprising dropping a mixture of various sizes of said material onto a piled mass at such a rate that a slope is formed which extends downward and outward from the top of the mass, thereby to effect a substantial segregation of the entire mass of material generally into several different size ranges which in relation to each other are relatively fine and relatively coarse and said different size ranges are disposed into different general zones within said mass, withdrawing said different size ranges of material from spaced locations respectively beneath the bottom of each of said general zones at a selected rate, and recombining the withdrawn material to produce a mixture having substantially the same average proportion of various size ranges of material as in the material delivered to said mass over an extended period of time.

9. The process set forth in claim 8 further characterized by said withdrawal of said different size ranges from the bottom of each of said general zones being at rates regulated generally to maintain at the top of said piled mass said slope which extends downward and outward therefrom.

10. The process set forth in claim 8 further characterized by said different size ranges of material being withdrawn separately from beneath the general zones thereof respectively at rates regulated relative to each other so as to produce a mixture having substantially the same average proportion of relatively fine and relatively coarse material as in the material delivered to said mass over an extended period of time.

11. The process set forth in claim 8 including the further step of adjusting the position of withdrawal of said different size ranges of material relative to the bottoms of each of said general zones to effect withdrawal of proportions of said different size ranges which when recombined will produce a mixture having substantially the same average proportion of various size ranges of material as in the material delivered to said mass over an extended period of time.

12. The process set forth in claim 8 further characterized by said withdrawal of said different size ranges of material from the bottoms of each general zone thereof being intermittent to maintain said slope extending downward and outward from the top of the piled mass.

13. The process set forth in claim 8, including the further step of feeding said recombined withdrawn material to a mill for autogenous grinding thereof.

References Cited in the file of this patent

UNITED STATES PATENTS

| | | |
|---|---|---|
| 1,369,248 | Krause | Feb. 22, 1921 |
| 1,663,173 | Pioda | Mar. 20, 1928 |
| 1,720,112 | Allen | July 9, 1929 |
| 1,781,097 | Bonnot | Nov. 11, 1930 |
| 2,381,351 | Hardubge | Aug. 7, 1945 |

FOREIGN PATENTS

| | | |
|---|---|---|
| 841,010 | France | Jan. 28, 1939 |